United States Patent Office 3,256,158
Patented June 14, 1966

3,256,158
PURIFICATION OF UROKINASE
Wilfrid Francis White, Lombard, Ill., assignor to Abbott Laboratories, Chicago, Ill., a corporation of Illinois
No Drawing. Filed Mar. 22, 1963, Ser. No. 267,340
3 Claims. (Cl. 195—66)

This invention relates to the purification of urokinase and more particularly to a method of obtaining urokinase of high potency free of pyrogens and clot promoting substances such as thromboplastin by treatment of impure aqueous solutions thereof with a crosslinked dextran gel.

Urokinase is a complex protein of unknown structure which is found in human urine in trace amounts. It is a potent, blood clot lysing agent and when injected in amounts far greater than those which exist naturally in urine will promote the dissolution of blood clots. Because if its great potential in the treatment of thromboembolic disorders, urokinase has intrigued the imagination of research scientists throughout the world. During the past decade, attempts have been made to isolate and purify urokinase of sufficient potency so that it could be useful in dissolving human blood clots, especially coronary thrombi, a disease state which is one of the main causes of death in many countries of the world.

Some progress has been achieved in isolating urokinase but certain obstacles still remain—to wit, the urokinase obtained to date although quite potent still contains pyrogens and clot promoting substances which makes intravenous injection hazardous. Several methods for the isolation and partial purification of urokinase are known. In U.S. Patent 2,983,647, there is described a method of recovering urokinase from human urine in a potency of from 3,000 to 10,000 units per milligram. However, urokinase thus prepared which has not been rendered free of pyrogens and clot promoting impurities can result in serious side effects if injected intravenously.

It is an object of the present invention to provide a simple and expeditious method for separating urokinase with hitherto unobtainable potency from pyrogens and other deleterious substances by the application of gel filtration phenomena.

A more specific object of the invention is to provide a method for obtaining urokinase of sufficient purity and potency from partially purified solutions thereof so that the danger of a pyrogenic response is eliminated when such urokinase is injected intravenously into a living host with a thromboembolic disorder.

The ultimate object of this invention is to provide a urokinase product with a minimum potency of 80,000 units per milligram which is devoid of pyrogens and thromboplastin.

The present invention is based upon the discovery that certain crosslinked dextran gels can be employed to increase the potency of urokinase and remove the pyrogens and clot promoting substances associated therewith in urokinase solutions which have previously been partially purified for example by adsorption and elution through a cation exchange resin. A typical resin so employed in the past is of the methacrylic-carboxylic acid type known as Amberlite IRC–50, manufactured by Rohm & Haas of Philadelphia, Pennsylvania. When such an eluate is contacted with a crosslinked dextran gel, there is achieved in a single step the conversion of partially purified urokinase containing undesirable impurities with a potency of 5,000 to 18,000 units per milligram of protein to a product free of pyrogens and clot promoting substances with a potency of 80,000 units or more per milligram of protein.

Dextran is a polysaccharide synthesized microbiologically by the action of *Leuconostoc mesenteroides* strain NRRL B–512 on sucrose. The product so obtained is a high molecular weight glucan containing about 90% alpha-1,6-glucosidic bonds whereas the remaining bonds are mainly of a 1,3-glucosidic type. When such native dextran is properly treated and copolymerized with epichlorohydrin or other epoxy compounds as described in U.S. Patent 3,042,667, there is obtained a crosslinked dextran gel which is water insoluble but capable of absorbing water with swelling in such a manner that the water regain of said gel is about 1 to 50 grams per gram of dry gel product. Such gels are produced by Aktiebolaget Pharmacia of Uppsala, Sweden, and sold under the trade name of Sephadex in various molecular weight ranges and sieve sizes.

A unit of urokinase activity as herein employed defines its ability to activate the plasminogen in a preformed fibrin clot which eventually results in the dissolution of said clot. The procedure for determining such activity is based upon a modification of Fletcher's clot dissolution method described in Biochem, Journal, 56, 677 (1954). Briefly, various amounts of urokinase are added to test tubes containing one milliliter of a 1.6% fibrinogen solution obtained from bovine Fraction 1 in a 1.03% sodium barbital buffer. Fibrin clots are then formed by the addition of thrombin and the tubes are incubated at 37° C. for 17 hours during which time clot lysis occurs. The amount of urokinase resulting in 50% lysis is estimated and compared to a standard assigned an arbitrary unit of activity. By parallel assay, one unit of urokinase activity as referred to in this specification is the equivalent of 0.5 unit described in U.S. Patent 2,983,647.

Some specific embodiments of the best mode contemplated by the inventor for carrying out the present invention are set forth in the following examples.

*Example 1*

An aqueous slurry of Sephadex G–100 gel (dextran crosslinked with about 6% epichlorohydrin and having a water regain of 10 grams per gram of dry gel) was adjusted to a pH of 6.5 by the addition of an aqueous buffer solution containing 0.1 mole each of sodium phosphate and sodium chloride plus 0.1% of ethylenediaminetetraacetic acid. After swelling of the gel was complete, the buffered gel suspension was placed in a glass column 3 cm. in diameter and 108.5 cm. high. Thereafter, a concentrated aqueous solution containing 196 mg. of partially purified urokinase per ml. of buffer was percolated through the column at a rate of 33 ml. per hour at 3°–5° C. to avoid bacterial contamination. The total load on the column was 100,000 units of urokinase per square centimeter cross-section of column. This urokinase sample failed to pass the United States Pharmacopeia pyrogen test at 5,000 units per kilogram. During passage through the column, samples containing 5.2 ml. of eluate were continuously collected in tubes and tested individually for optical absorbance at 280 millimicrons. Based upon such absorbance, it was found that four main protein peaks emerged which were designated as Fractions A, B, C and D in the order of their appearance. These four fractions were assayed for pyrogens and urokinase potency. Thus, tubes 1–50 when pooled as Fraction A were highly pyrogenic. Tubes 50–60 combined as Fraction B and tubes 70–100 designated as Fraction D had no biological activity whereas Fraction C consisting of tubes 60–70 contained all the urokinase activity and this fraction passed the U.S.P. pyrogen test at 20,000 units per kilogram. When Fraction C was dialyzed against distilled water and lyophilized, there was obtained seven mg. of solid urokinase with a potency of 80,000 units per mg.

Example 2

In another run, the same procedure described in Example 1 was followed except that the column was packed with a mixture consisting of 60 parts by weight of Sephadex G-100 and 40 parts by weight of Sephadex G-200, the latter of which is a dextran gel crosslinked with about 6% epichlorohydrin but having a water regain of 20 grams per gram of dry gel. The urokinase solution passed through the gel column contained 2.7 grams of partially purified urokinase per 15.6 ml. of buffer solution. This urokinase sample would not pass the U.S.P. pyrogen test at 5,000 units per kilogram. By collecting samples of the eluate and determining the optical absorbance at 280 millimicrons, it was found that there was a greater spread between the A and C peaks as compared to the use of Sephadex G-100 alone. All of the pyrogens were associated with tubes 1-50 wherein each tube contained 19.3 ml. of eluate which were combined and designated Fraction A. Tubes 50-70 designated as Fraction B and tubes 85-115 designated as Fraction D were biologically inactive. Fraction C consisting of the eluates collected in tubes 70-85 contained all of the urokinase activity and were devoid of pyrogens and other clot promoting substances. The potency of the urokinase isolated from Fraction C was 86,000 units per mg. and passed the standard pyrogen test at 20,000 units per kilogram.

Example 3

A starting material pool was prepared by mixing three separate batches of partially purified urokinase. The total bioactivity of the pool was 207 million units of urokinase with a potency of 18,300 units per mg. The urokinase in this pool failed to pass the U.S.P. pyrogen test at a dose of 5,000 units per kg. The starting pool was divided into 10 parts and each part was passed through a column three inches in diameter and 105 cm. high filled with Sephadex G-100 as described in Example 1. The third effluent peak designated as Fraction C was collected and divided into three parts. The corresponding parts from each column were then pooled and assayed for bioactivity, potency and pyrogens with the following results:

| Fraction | Units of Urokinase, million | Potency, units/mg. | Pyrogens at 50,000 units/kg. |
|---|---|---|---|
| C₁ | 58.5 | 92,000 | Negligible. |
| C₂ | 71.1 | 101,000 | None. |
| C₃ | 22.1 | 74,000 | Negligible. |

Thus, the entire purification increased the potency of the urokinase employed from 18,300 units per mg. to an average of 93,000 units per mg. in a yield of 73%. Since all three parts of Fraction C passed the U.S.P. pyrogen test at 50,000 units per kg., no further treatment was necessary. It was also ascertained that Fraction C was completely devoid of thromboplastin.

Although Sephadex G-100 and G-200 were employed in the specific examples, other crosslinked dextran gels of the type described in U.S. Patent 3,042,667 can be advantageously substituted with good results if desired. Thus, one can employ dextran, hydrodextran, 2-hydroxypropyldextran or sodiumcarboxymethyldextran crosslinked with various percentages of not only epichlorohydrin but with ethyleneglycol-bis-epoxypropyl ether, glycerine-1,3-dichlorohydrin, bisepoxypropyl ether, 1,4-butanediol-bis-epoxypropyl ether or 1,2,3,4-diepoxybutane. These copolymerization products are all water insoluble and have a water regain of from 1 to 50 grams per gram of dry gel. It is, however, preferable to employ a dextran gel crosslinked with from 6% to 35% by weight of epichlorohydrin.

I claim:

1. A method of purifying urokinase devoid of pyrogens and thromboplastin which comprises contacting an impure aqueous solution of said urokinase with a neutral dextran gel crosslinked with about 6% epichlorohydrin, said gel having a water regain of from about 10 to about 20 grams per gram of dry gel, collecting fractions of the eluate, and thereafter separating and recovering the fraction which contains the urokinase activity from the fractions containing all of the pyrogens and thromboplastin and those fractions having no biological activity 2. A method as claimed in claim 1 wherein the impure aqueous solution is contacted with the neutral dextran gel at a temperature of about 5° C.

3. A method as claimed in claim 1 in which the gel employed is a mixture of 60% dextran crosslinked with about 6% by weight of epichlorohydrin having a water regain of 10 grams per gram of dry gel and 40% dextran crosslinked with about 6% by weight of epichlorohydrin having a water regain of 20 grams per gram of dry gel.

References Cited by the Examiner

UNITED STATES PATENTS

| | | | |
|---|---|---|---|
| 2,983,647 | 5/1961 | Kjeldgaard et al. | 195—66 X |
| 2,989,440 | 6/1961 | Singher et al. | 195—66 |
| 3,042,667 | 7/1962 | Flodin et al. | 260—209 |
| 3,107,203 | 10/1963 | Baumgarten et al. | 195—66 |
| 3,140,984 | 7/1964 | Tosoni et al. | 195—66 |

OTHER REFERENCES

Flodin et al.: Nature, vol. 188, pp. 493–494 (Nov. 5, 1960).

Porath et al.: Nature, vol. 191, pp. 69–70 (July 1961).

A. LOUIS MONACELL, *Primary Examiner.*

L. M. SHAPIRO, *Assistant Examiner.*